United States Patent [19]

Kielhorn

[11] Patent Number: 4,702,072
[45] Date of Patent: Oct. 27, 1987

[54] INTERNAL COMBUSTION ENGINE

[76] Inventor: Gerhard Kielhorn, Sommerhalde 33, D-7900 Ulm-Ermingen, Fed. Rep. of Germany

[21] Appl. No.: 767,712

[22] Filed: Aug. 20, 1985

[30] Foreign Application Priority Data

Aug. 20, 1984 [DE] Fed. Rep. of Germany ....... 3430613

[51] Int. Cl.[4] .............................................. F02C 5/12
[52] U.S. Cl. ................................... 60/39.39; 60/39.38
[58] Field of Search ................... 60/39.38, 39.39, 39.4, 60/39.76, 247

[56] References Cited

U.S. PATENT DOCUMENTS

| 1,654,119 | 12/1927 | Enders | 60/39.39 |
| 2,370,217 | 2/1945 | Wright | 60/39.38 |
| 2,928,239 | 3/1960 | Goldstein | 60/39.39 |
| 2,928,242 | 3/1960 | Guenther | 60/39.39 |
| 3,375,657 | 4/1968 | Sherwood et al. | 60/39.76 |

FOREIGN PATENT DOCUMENTS

| 140444 | 1/1935 | Austria. |
| 140446 | 1/1935 | Austria. |
| 1932119 | 1/1971 | Fed. Rep. of Germany. |
| 1626045 | 3/1971 | Fed. Rep. of Germany. |
| 2232025 | 1/1974 | Fed. Rep. of Germany. |
| 2900227 | 7/1980 | Fed. Rep. of Germany. |
| 2739129 | 12/1981 | Fed. Rep. of Germany. |
| 998596 | 1/1952 | France. |
| 467630 | 6/1937 | United Kingdom ............... 60/39.39 |

Primary Examiner—Louis J. Casaregola
Assistant Examiner—Donald E. Stout
Attorney, Agent, or Firm—Toren, McGeady & Associates

[57] ABSTRACT

The internal combustion engine comprises a stator (1, 9) and a rotor (7) rotatably mounted on the stator (1, 9). The stator (1, 9) comprises at least one stationary combustion chamber (11) having an outflow opening (19) directed towards the rotor (7). On the rotor there is provided at least one working surface (25) movable past the outflow opening (19) charged by the outflowing combustion gases. Charging and ignition equipment charges the combustion chamber (11) intermittently with combustion gas and ignites the charge. The charging and ignition equipment includes a compressor which chages the compressed combustion gas substantially oppositely to the direction (43) of outflow of the iginited combustion gases from the combustion chamber (11). The working surface (25) is formed by an expansion chamber (15) of the rotor and expands the used combustion gases, which are deflected substantially oppositely to the direction of introduction, preferably in one single expansion step, substantially to the ambient pressure of their outlet opening, that is atmospheric pressure.

8 Claims, 9 Drawing Figures

INTERNAL COMBUSTION ENGINE

The invention relates to an internal combustion engine and especially an internal combustion engine having a stator and a rotor rotatably mounted on the stator.

Such an internal combustion engine is known from U.S. Pat. No. 1,654,119. The stator contains several stationary combustion chambers each of which has an outflow opening directed towards the rotor. The rotor carries a plurality of working surfaces in the form of turbine blades distributed over its circumference. Under rotary slide valve control, fuel-air mixture is fed intermittently to the combustion chambers and ignited. To increase the speed of outflow of the ignited combustion gases the combustion chambers narrow towards the outflow opening. The fuel-air mixture is fed to the combustion chambers in the outflow direction of the ignited combustion gases.

Similar internal combustion engines are known from Austrian Pat. No. 140,446 and French Pat. No. 998,596. In these internal combustion engines the fuel-air mixture is compressed by a compressor before introduction into the combustion chamber. The compressor according to French Pat. No. 998,596 is a channel-wheel compressor coupled with the rotor through a planetary gearing.

It is the problem of the invention to show a way in which the efficiency of an internal combustion engine of the kind as explained above can be increased in a constructively simple manner.

The invention is based upon an internal combustion engine having a stator and a rotor rotatably mounted on the stator, in which the stator comprises at least one stationary combustion chamber with an outflow opening directed towards the rotor and the rotor is provided with at lest one working surface which is movable past the outflow opening. The internal combustion engine further comprises charging and ignition equipment which intermittently charges the combustion chamber with combustible gas and ignites the charge.

The improvement according to the invention consists in that the charging and ignition equipment comprises a compressor for the combustion gas and charges the compressed combustion gas substantially oppositely to the outflow direction of the ignited combustion gases into the combustion chamber, and in that the working surface is formed by an expansion chamber of the rotor.

The combustion chamber is closed oppositely to the outflow direction, whereby the fresh gas supplied by the compressor oppositely to the outflow direction is additionally compressed in the combustion chamber.

On ignition a pressure pulse occurs which strikes through the outflow opening of the combustion chamber directly upon the working surface of the expansion chamber rotating with the rotor. In the expansion chamber the combustible gas expands preferably to the ambient pressure of its outlet opening, that is to atmospheric pressure. The used combustible gas passes at relatively low speed out of the working region of the rotor. The speed at which the combustible gas is charged into the combustion chamber and the subsequent combustion on the other hand are comparatively very fast. These speeds preferably amount to more than 300 m./sec.

Working media in general are to be understood above and also below by combustible gases. The invention is independent of whether the compressor charges the combustion chamber with fuel-air mixture or merely supplies compressed air into which fuel is injected, for example in the combustion chamber. The charging and ignition equipment can be of such design that it charges the combustible gas into the combustion chamber with a pressure sufficing for self-ignition.

In a preferred form of embodiment the internal crosssectional area of the combustion chamber reduces substantially constantly contrarily of the direction of outflow of the ignited combustion gases. This measure increases the combustion gas pressure achievable with adiabatic compression, and thus the efficiency. Combustion chambers with parabolic internal peripheral surface, which concentrate the combustion gas fed by the compressor in the vicinity of the combustion point, are especially suitable. An ignition source of the charging and ignition equipment is preferably also provided in the vicinity of the combustion point. In principle however somewhat cylindrical combustion chambers are also suitable.

The working surface of the expansion chamber is preferably so arranged that the combustion gases issuing from the outflow opening are deflected through nearly 180° in order that the pressure pulse of the ignited combustion gases may be optimally exploited. The expansion chamber in this case is expediently so dimensioned that it expands the used combustion gases in one single expansion step per ignition substantially to the ambient pressure of the outlet opening, that is atmospheric pressure. Thus losses of efficiency due to guide blades or the like can be avoided.

For optimum conversion of the kinetic energy of the combustion gases issuing from the combustion chamber the direction of outflow should be perpendicular to the axial longitudinal sectional plane of the rotor. In order to be able to achieve optimum approximation to this condition, the combustion chamber is preferably arranged axially laterally of the path of movement of the expansion chamber and the direction of outflow of the combustion chamber extends at an acute angle substantially tangentially of the path of movement of the expansion chamber. Likewise the expansion chamber gives off the used combustion gases with direction of flow placed substantially tangentially to the path of movement, preferably through an outlet opening open in the circumferential direction of the rotor. The outlet opening of the expansion chamber can be adjoined by a spiral circumferential surface tending radially outwards oppositely to the direction of rotation of the rotor and delivering the used combustion gases outwards by reason of the rotation of the rotor.

In a preferred form of embodiment the compressor comprises a vane wheel rotating contrarily of the direction of rotation of the rotor, while the combustion chambers of the stator are provided in a housing ring surrounding the vane wheel. The vane wheel delivers the compressed combustion gases through radial openings into the combustion chambers which immediately adjoin the vane wheel circumference. In this way the compressed combustion gases are charged with the circumferential speed of the vane wheel directly into the combustion chambers. For the control of the intermittent combustion chamber operation rotary slide valves are provided on the rotor and rotate together with the latter and control the inlet and outlet openings of the combustion chambers. The vane wheel can be driven directly through a reversing gearing, for example a planetary gearing, preferably with rotation rate step-up. In addition to the vane wheel the compressor can comprise additional pre-compressors in order that the entry pressure of the combustion chamber may be increased.

An example of embodiment of the invention is to be explained below in greater detail with reference to drawings, wherein.

Figure 1:
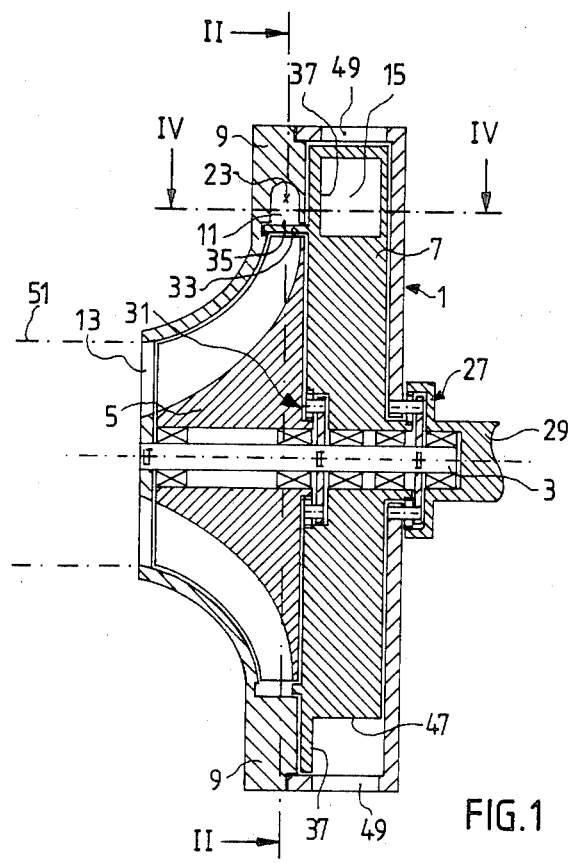
FIG. 1 shows a diagrammatic axial longitudinal section through an internal combustion engine, seen along a line I—I in FIG. 2.
Figure 2:
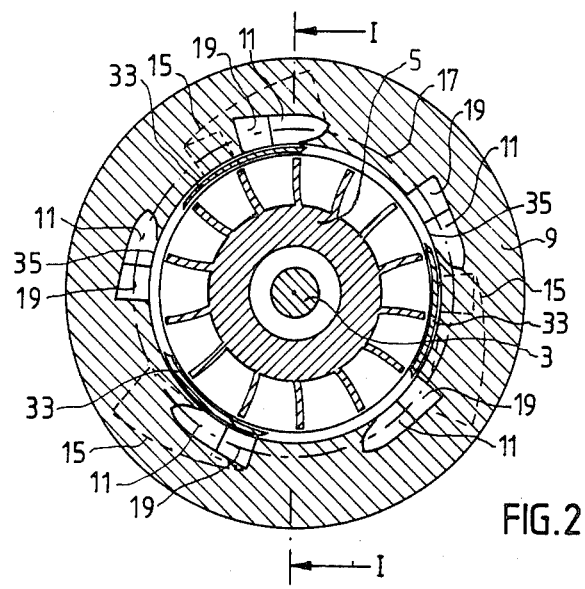
FIG. 2 shows an axial cross-section through the internal combustion engine, seen along a line II—II in FIG. 1.

The internal combustion engine comprises a housing 1 in which a radial compressor vane wheel 5 of a compressor and a rotor 7 are rotatably mounted axially side by side on a spindle 3 fast with the housing. In a housing ring 9 enclosing the vane wheel 5 there are arranged several combustion chambers 11, in this case five, which are charged by way of the vane wheel 5 of the compressor from radially inwards with combustion gas supplied at a compressor entry 13. The rotor 7 comprises several expansion chambers 15 which are arranged substantially on the circle 17 of arrangement of the combustion chambers 11 axially laterally of the combustion chambers 11. The combustion chambers 11 have outlet openings 19 axially adjacent to the rotor 7, with which there are associated entry openings 21 (FIGS. 4 and 5) of the expansion chambers 15. The combustion gases, ignited by means of a spark plug 23 or the like, act upon working surfaces 25 in the expansion chambers and drive the rotor 7. the rotor 7 is connected through a planetary step-down gearing 27 with a drive-output shaft 29 and through a planetary step-up gearing 31 drives the vane wheel 5 with converse direction of rotation, in relation to its direction of rotation.

For the control of the discontinuous operation of the combustion chambers 11 the rotor 7 carries slide valve segments 33 which rotate betweent he external circumference of the vane wheel 5 and radially inwardly open inlet openings 35 of the combustion chambers 11, and close the combustion chambers 11 when overlapping with the inlet openings 35. The slide valve segments 33 are hollow cylinder segments arranged coaxially with the rotation axis of the rotor 7 and protruding axially from the rotor 7. The rotor 7 further carries, axially adjacent to the housing ring 9, a slide valve disc 37 covering the outlet openings 19 of the combustion chambers, which closes the outlet openings 19 except for the region of overlap with the entry openings 21 of the expansion chambers 15. The radial thickness of the slide valve segments 33 and the axial thickness of the slide valve disc 37 is kept as small as possible in order to minimise flow losses and to be able to maintain directions of flow which are explained below.

Figure 3A:
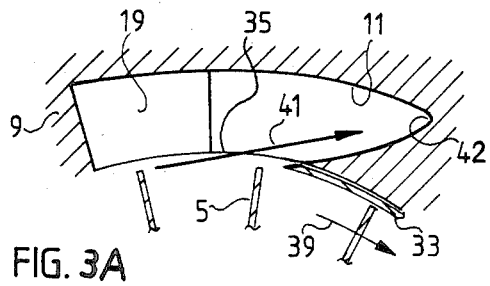
FIGS. 3a to 3c show a detail of FIG. 2, represented at different points in time of the working cycle of the internal combustion engine.

Each of the combustion chambers 11, in relation to its direction of outflow, is arranged in a plane parallel to the axis of rotation of the rotor 7, namely so that the direction of outflow extends at an acute angle of for example 20° or less to a plane normal to the axis. As FIG. 3a shows, the vane wheel 5 rotating in the direction of an arrow 39 delivers the combustion gases substantially tangentially through the inlet opening 35 in the direction of an arrow 41 on to the closed end wall 42, lying opposite to the outflow opening 19 in the circumferential direction, of the combustion chamber 11. The internal cross-section of the combustion chambers 11 tapers from the outflow opening 19 to the closed end wall 43, so that the inflowing combustion gses are compressed in the region of the closed end wall 43. The internal wall surfaces expediently have parabolic form so that an especially high compression results in the region of the combustion point. the spark plug 23 is also arranged in the region of the combustion point in order to achieve the most rapid possible liberation of the energy of the combustion gas.

Figure 3B:
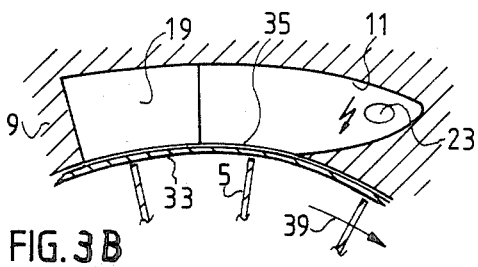
Figure 3C:
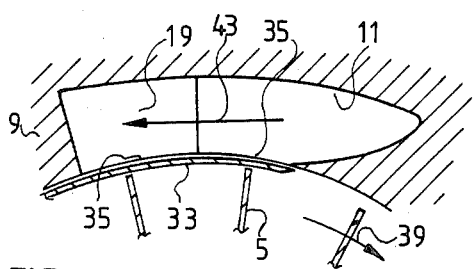

FIG. 3a shows the combustion chamber 11 in a charging phase in which it is being charged with fresh gas in the direction of the arrow 41, with the inlet opening 35 opened. During the charging phase the outlet opening 19 is closed. FIG. 3b shows the ignition phase in which the combustion gs, adiabatically compressed in the combustion point, is being ignited. The inlet opening 35 and the outlet opening 19 are substantially closed. FIG. 3c shows the working phase of the combustion chamber 11 in which the ignited combustion gases are emerging through the outflow opening 19 in the direction of an arrow 43, in the form of a pressure wave, substantially oppositely to the direction 41 of inflow. The inlet opening 35 is here closed, while the outflow opening 19 corresponds axially with the inlet opening 21 of one of the expansion chambers 15.

Figure 4A:
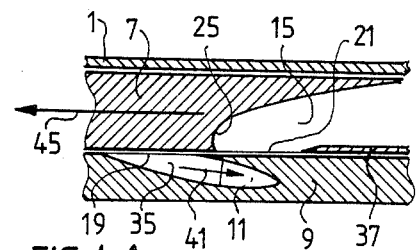
FIGS. 4a to 4c show a detail view of the internal combustion engine seen along a line IV—IV in FIG. 1 at different points in time of the working cycle of the internal combustion engine.
Figure 4B:
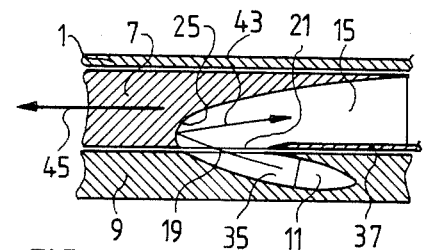
Figure 4C:
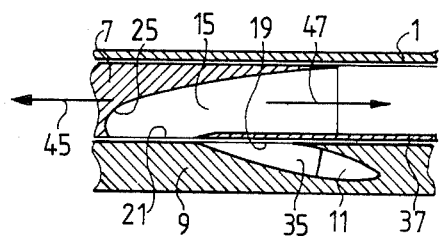
Figure 5:
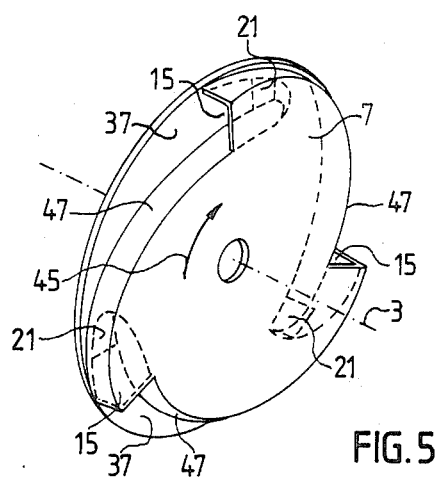
FIG. 5 shows a perspective lateral elevation of a rotor of the internal combustion engine.

FIGS. 4a to 4c show this situation in another sectional view. FIG. 4a shows the charging phase, FIG. 4b the working phase in which the gases issuing from the outflow opening 19 strike upon the working surface 25 of the expansion chamber 15, which is moving in the direction of an arrow 45. The working surface 25 is shaped so that the outflowing gases are deflected as extensively as possible through 180° and issue from the expansion chamber 15 preferably in the circumferential direction 47 of the rotor, FIG. 4c shows the exhaust phase of the expansion chamber 15, in which the exhaust gases, which have entered the expansion chamber 15 as a pressure wave of pulse form, are expanded substantially to the ambient pressure of the outlet opening of the expansion chamber 15, that is atmospheric pressure. The exhaust phase can overlap with the charging phase of the combustion chamber 11. The used combustion gases issue at comparatively low speed of flow from the spiral circumferential surfaces 47 of the rotor 7 and are conducted away radially by way of circumferential openings 49 of the housing 1.

In FIG. 1 there is represented only the vane wheel 5 of a compressor. The inlet opening 13 can be preceded by additional pre-compressor stages, such as are indicated at 51. The example of embodiment as illustrated comprises only one single rotor. However the internal combustion engine can be assembled with several rotors and especially mirror-image arrangements by pairs are preferred in order to compensate for axial thrust components of the combustion chambers. The compressor can compress fuel-air mixture and feed it to the combustion chambers; it can also be provided however that the compressor compresses only air, while the fuel is injected directly especially into the combustion chambers. Combustion-promoting, especially combustionaccelerating additives may be added to the combustion gas, just as the combustion chamber walls can be coated with catalyst materials promoting the combustion or its rate. The expansion chambers preferably have the profile of a Lavalle nozzle. The idea of expanding the combustion gases in a rotating expansion chamber to atmospheric pressure in one step is also usable in combustion chambers other than that explained above, especially also in continuously operated combustion chambers. To this extent this idea has independent inventive significance.

I claim:

1. Internal combustion engine comprising
   (a) a stator (1) with a central axis and having at least one combustion chamber spaced outwardly from and extending generally circumferentially of the central axis, said combustion chamber having a first end and a closed second end (42), said combustion chamber has an inlet opening and an outlet opening located adjacent the first end thereof so that said combustion chamber has a predetermined outflow direction (43) extending in the direction from the second end toward the first end,
   (b) a rotor (7) rotatably supported adjacent said stator for rotation about the central axis and having at lest one expansion chamber movable past the outlet opening (19) of said combustion chamber (11), said expansion chamber having a first working surface (25) therein for redirecting the combustion gases flowing from the outlet (19) into a direction essentially opposite to the outflow direction (43),
   (c) a compressor (5) arranged to charge the combustion chamber with compressed combustion gas through the inlet opening (35) in the direction toward the closed second end (42), said compressor comprising a vane wheel (5) rotatable about the central axis in the rotational direction (39) opposite to the direction of rotation (45) of said rotor (7), said compressor accelerates the compressed combustion gases in the circumferential direction relative to the central axis and introduces the compressed combustion gas in the tangential direction of flow through the inlet opening (35) into said combustion chamber (11),
   (d) a valve means (33, 37) for connecting alternately said inlet opening (35) of said combustion chamber (11) with said compressor (5) and the outlet opening (19) of the combustion chamber (11) with said expansion chamber (25),
   (e) ignition means (23) for igniting the combustion gases intermittently charged into said combustion chamber (11), and
   (f) said expansion chamber (15) extends in the circumferential direction about the central axis and has an inlet opening adjacent said working surface (25) and an outlet opening spaced in the circumferential direction relative to the central axis from the working surface (25), and said expansion chamber (15) is shaped so that the combustion gases entering the expansion chamber (15) from the combustion chamber (11) through said valve means (33, 37) are expanded essentially in a single expansion stage down to the pressure of the ambient atmosphere.

2. Internal combustion engine according to claim 1, wherein the internal cross-sectional area of said combustion chamber (11) extending transversely of the circumferential direction is reduced substantially constantly in the direction of flow from the inlet opening (35) to the closed second end (42).

3. Internal combustion engine according to claim 1, characterised in that the combustion chamber (11) has substantially parabolic internal circumferential surfaces.

4. Internal combustion engine according to claim 3, characterised in that said ignition means comprises an ignition source (23) arranged in the region of the second end thereof forming a combustion point in the parabolic internal circumferential surface.

5. Internal combustion engine according to claim 1, characterised in that the working surface (25) of the rotor (7) deflects the ignited combustion gases issuing from the outflow opening (19) substantially through 180°.

6. Internal combustion engine comprising
   (a) a stator (1) with a central axis and having at least one combustion chamber spaced outwardly from and extending generally circumferentially of the central axis, said combustion chamber having a first end and a closed second end (42), said combustion chamber has an inlet opening and an outlet opening located adjacent the first end thereof so that said combustion chamber has a predetermined outflow direction (43) extending in the direction from the second end toward the first end,
   (b) a rotor (7) rotatably supported adjacent said stator for rotation about the central axis and having at least one expansion chamber movable past the outlet opening (19) of said combustion chamber (11), said expansion chamber having a first working surface (25) therein for redirecting the combustion gases flowing from the outlet (19) into a direction essentially opposite to the outflow direction (43),
   (c) a compressor (5) arranged to charge the combustion chamber with compressed combustion gas through the inlet opening (35) in the direction toward the closed second end (42), said compressor comprising a vane wheel (5) rotatable about the central axis in the rotational direction (39) opposite to the direction of rotation (45) of said rotor (7), said compressor accelerates the compressed combustion gases in the circumferential direction relative to the central axis and introduces the compressed combustion gas in the tangential direction of flow through the inlet opening (35) into said combustion chamber (11),
   (d) a valve means (33, 37) for connecting alternately said inlet opening (35) of said combustion chamber (11) with said compressor (5) and the outlet opening (19) of the combustion chamber (11) with said expansion chamber (25),
   (e) ignition means (23) for igniting the combustion gases intermittently charged into said combustion chamber (11), and
   (f) said combustion chamber is arranged in the direction of the central axis axially laterally of the path of movement of said expansion chamber (15), the predetermined outflow direction (43) of the outflow of said combustion chamber (11) extends at an acute angle to the path of movement of said expansion chamber (15) substantially in a plane parallel to the central axis, and said expansion chamber (15) expands the combustion gases with the direction of flow extending substantially tangentially to the path of movement, said compressor (5) charges the combustion chamber (11) at an acute angle to the predetermined outflow direction (43) from the side facing the central axis.

7. Internal combustion engine comprising
(a) a stator (1) with a central axis and having at least one combustion chamber spaced outwardly from and extending generally circumferentially of the central axis, said combustion chamber having a first end and a closed second end (42), said combustion chamber has an inlet opening and an outlet opening located adjacent the first end thereof so that said combustion chamber has a predetermined outflow direction (43) extending in the direction from the second end toward the first end,
(b) a rotor (7) rotatably supported adjacent said stator for rotation about the central axis and having at least one expansion chamber movable past the outlet opening (19) of said combustion chamber (11), said expansion chamber having a first working surface (25) therein for redirecting the combustion gases flowing from the outlet (19) into a direction essentially opposite to the outflow direction (43),
(c) a compressor (5) arranged to charge the combustion chamber with compressed combustion gas through the inlet opening (35) in the direction toward the closed second end (42), said compressor comprising a vane wheel (5) rotatable about the central axis in the rotational direction (39) opposite to the direction of rotation (45) of said rotor (7), said compressor accelerates the compressed combustion gases in the circumferential direction relative to the central axis and introduces the compressed combustion gas in the tangential direction of flow through the inlet opening (35) into said combustion chamber (11),
(d) a valve means (33, 37) for connecting alternately said inlet opening (35) of said combustion chamber (11) with said compressor (5) and the outlet opening (19) of the combustion chamber (11) with said expansion chamber (25),
(e) ignition means (23) for igniting the combustion gases intermittently charged into said combustion chamber (11), and
(f) said combustion chamber is arranged in the direction of the central axis axially laterally of the path of movement of said expansion chamber (15), the predetermined outflow direction (43) of the outflow of said combustion chamber (11) extends at an acute angle to the path of movement of said expansion chamber (15) substantially in a plane parallel to the central axis, and said expansion chamber (15) expands the combustion gases with the direction of flow extending substantially tangentially to the path of movement, said expansion chamber (15) comprises an exit opening open in the circumferential direction of said rotor (7), said expansion chamber has a radially inner marginal region adjoined by a spiral circumferential surface (47) tending radially outwardly opposite to the direction of rotation of said rotor (7).

8. Internal combustion engine comprising
(a) a stator (1) with a central axis and having at least one combustion chamber spaced outwardly from and extending generally circumferentially of the central axis, said combustion chamber having a first end and a closed second end (42), said combustion chamber has an inlet opening and an outlet opening located adjacent the first end thereof so that said combustion chamber has a predetermined outflow direction (43) extending in the direction from the second end toward the first end,
(b) a rotor (7) rotatably supported adjacent said stator for rotation about the central axis and having at least one expansion chamber movable past the outlet opening (19) of said combustion chamber (11), said expansion chamber having a first working surface (25) therein for redirecting the combustion gases flowing from the outlet (19) into a direction essentially opposite to the outflow direction (43),
(c) a compressor (5) arranged to charge the combustion chamber with compressed combustion gas through the inlet opening (35) in the direction toward the closed second end (42), said compressor comprising a vane wheel (5) rotatable about the central axis in the rotational direction (39) opposite to the direction of rotation (45) of said rotor (7), said compressor accelerates the compressed combustion gases in the circumferential direction relative to the central axis and introduces the compressed combustion gas in the tangential direction of flow through the inlet opening (35) into said combustion chamber (11),
(d) a valve means (33, 37) for connecting alternately said inlet opening (35) of said combustion chamber (11) with said compressor (5) and the outlet opening (19) of the combustion chamber (11) with said expansion chamber (25),
(e) ignition means (23) for igniting the combustion gases intermittently charged into said combustion chamber (11), and
(f) said stator (1) includes a housing ring (9) containing several combustion chambers (11), said housing ring is spaced radially outwardly from said vane wheel and has inlet openings (35) affording radial outward flow from said vane wheel into said combustion chambers, said combustion chambers have outlet openings (19) for directing flow axially relative to the central axis, and said rotor (7) carries said valve means for controlling flow into said combustion chamber through said inlet openings (35) and from said combustion chambers (11) through said outlet openings (19).

* * * * *